United States Patent [19]

Su

[11] 3,929,090

[45] Dec. 30, 1975

[54] LEAKAGE WARNING DEVICE FOR VEHICLE TIRE

[76] Inventor: Chiang-Shui Su, No. 237 Ming Kuo Road, Chia-Yi, China /Taiwan

[22] Filed: Nov. 21, 1974

[21] Appl. No.: 525,879

[52] U.S. Cl. ............................................... 116/34 R
[51] Int. Cl.² ........................................ B60C 23/02
[58] Field of Search .................................. 116/34 R

[56] References Cited
UNITED STATES PATENTS

| | | | |
|---|---|---|---|
| 1,236,411 | 8/1917 | Downs | 116/34 R |
| 1,450,769 | 4/1923 | Crosby | 116/34 R |
| 1,507,546 | 9/1924 | Dillman | 116/34 R |
| 3,276,417 | 10/1966 | Flowers | 116/34 R |

*Primary Examiner*—Richard C. Queisser
*Assistant Examiner*—Marcus S. Rasco

[57] ABSTRACT

An air leakage warning device for a vehicle tire is described which includes a whistle producing member, a cylinder member containing a spring and a piston means, a rubber sack for covering the whistle producing member and the cylinder member, and a base member adapted for securing to an air valve means of the vehicle tire. When the air pressure of the tire is reduced to a predetermined valve, the piston means will act on the air valve and open the same to permit the air to flow into the device and thereby to swell and burst the rubber sack with an explosion. Thereafter the whistle producing means emits a whistle as air passes our therethrough.

2 Claims, 5 Drawing Figures

LEAKAGE WARNING DEVICE FOR VEHICLE TIRE

BACKGROUND OF THE INVENTION

This invention relates to an air leakage warning device for a vehicle tire, which is adapted to be mounted onto an air valve of the vehicle to give warning to the driver or rider when the air pressure in the tire drops to a certain predetermined value. As is known, air leakage of tires frequently occurs in running vehicles when a tire is pierced by nails or when something is wrong with its inner tube or air valve means. In case the leakage of air does occur and the driver is not aware of it and drives his vehicle in such condition, then even over a short distance, the tire will be greatly damaged. This condition is even more serious when a leakage occurs in one of the two tires of the rear wheels, especially heavy duty vehicles such as trucks or buses, and thus the other tire will eventually be subjected to an excessive load which may develop a blowout.

Before the condition progresses to a serious stage the leaky tire should be pumped with air or replaced by a spare one but unfortunately there has not been any means available for warning the driver in advance of the dangerous condition of the tire.

SUMMARY OF THE INVENTION

It is accordingly the principal object of the present invention to provide such a device which avoids the drawbacks of the prior art.

More particularly, it is an object of the present invention to provide a novel and unique device which reduces the possibility of damage to the vehicle tire during driving.

To this end, the invention contemplates the provision of a device comprising a whistle-producing member having a slit formed in the inner portion thereof and an air outlet port formed on the wall thereof, the latter being positioned adjacent the former; a cylinder or tubular member containing a perforated piston means and a spring, the upper end of the cylinder member being inter-connected with the whistle-producing member while the lower end thereof is secured to a base member which is adapted to be secured to the air valve seat of the vehicle tire; and a rubber sack adapted to cover the whistle-producing member and the cylinder member. When in use the above device is securely installed on the air valve seat in such a manner that the tip of the air valve will abut the lower end of a rod formed on the piston means. Therefore, when the air pressure of the tire is at normal valve, the tip of the air valve will act on the piston means to urge the same upwardly against the spring. But when the air pressure of the tire drops down, due to whatever cause, to a predetermined value lower than the restoration force of the spring, the rod will force the tip of the valve to make a downward movement and thereby to open the valve.

In this condition, the air contained in the tire will rush out and pass therefrom toward the whistle producing member through perforations formed on the piston member and cylinder member. Thereupon, the rubber sack will be swelled up like a balloon and as the pressure inside the balloon rises to its breaking point, the sack will burst and produce an explosive sound. This sound will draw the driver's attention to the fact that one of the tires is out of order and that some remedy must be taken. However, should the driver be unaware of the explosive sound, the whistle produced by the out-rushing air will definitely and consecutively call the driver's attention to the defective condition of the tire.

Moreover the device in accordance with the present invention can be used repeatedly by merely replacing the burst sacks with new ones.

These and other objects, features and advantages of the present invention will become more readly apparent upon detailed consideration of the following description of a preferred embodiment with reference to the accompanying drawings.

DETAILED DESCRIPTION OF THE PREFERRED EMBODIMENT

Figure 1:
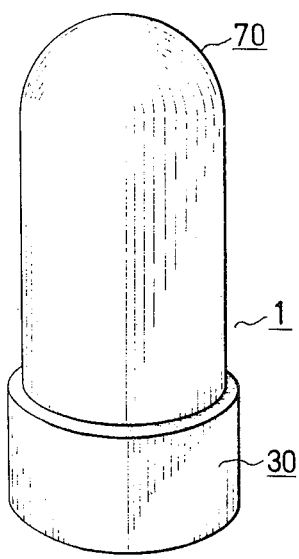
FIG. 1 is a perspective view of an air leakage warning device for a vehicle tire according to the present invention.
Figure 2:
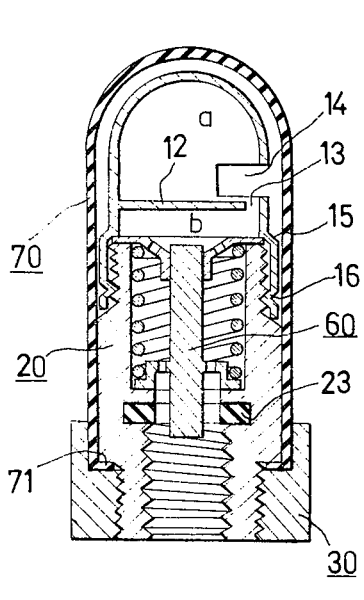
FIG. 2 is an elevational view, in section, of the device of FIG. 1.

Referring to the drawings, it will be seen that the device generally indicated at 1 of the present invention generally has a configuration of a bullet shape and is composed of a whistle producing member 10, a cylinder member 20, a base member 30, a perforated plate 40, a coil spring 50, a piston means 60 and a rubber sack 70. As is seen from the sectional views, the whistle producing member 10 comprises a hollow cylindrical body with its end enclosed by a semi-spherical wall 11. The inner space of said member 10 is separated into two spaces, i.e. $a$ and $b$ by a radially extending plate 12. At the juncture of the plate 12 and the inner wall of the member 10 there is formed an arched slit 13 and on the wall of the member 10, adjacent to the slit 13, there is formed a transverse air outlet port 14 opening into the space $a$. The lower portion of said member 10 is formed with a shoulder 15, which has a relatively larger diameter than the other portion, and the inner wall thereof is formed with a screw thread or plurality of transversely dotted protuberances as shown at 16. Through the protuberances 16 and screw thread 21 formed on the upper surface of the cylinder member 20, the whistle producing member 10 may be firmly interlocked with the cylinder member 20. In connecting the above two components, i.e. member 10 and 20, the piston member 60 should first be inserted in the cylinder member 20; then the coil spring 50; and finally, the perforated disk 40 on the upper end of the cylinder member 20 with the edge portion thereof resting thereon. Since the perforated disk 40 has an opening 41 at its center, and since the piston means 60 has a centrally extending rod 61 of an enough length, when the above-mentioned assembly has been completed, the upper portion of the rod 61 will engage the opening 41 with its end exposing in the space $b$. As can be seen from the drawings, the piston means 60 is simply seated on the inwardly extending annular portion 22 formed in the inner wall of the cylinder member 20 and the peripheral edge portion of the disk plate 40 is fixedly secured inbetween the end of the member 20 and the shoulder portion 15 of the whistle producing member 10. Thus the piston means 60 will be urged upwardly when a force exceeding the spring force of the spring 50 is applied to the rod 61 of the piston 60.

The lower portion of the cylinder member 20 has an outer diameter smaller than the upper portion and both of the outer and inner surfaces thereof are formed with screw threads. The outer screw thread is used for screwing into the base member 30 while the inner screw thread is used for screwing the assembly onto the air valve body provided on the tire as shown in FIG. 5.

The base member 30 has an outer diameter larger than the cylinder member 20 and is provided with an annular recess 31 for receiving the lower end of the rubber sack 70. Member 23 is an O-ring to provide an effective pneumatic seal.

Before interlocking the cylinder member 20 with the base member 30, the whistle producing member 10 and the upper portion of the cylinder member 20 should previously be covered with the rubber sack 70. The rubber sack 70 is provided with an inwardly bent annular rim 71 at the lowermost end thereof; and hence when the cylinder member 20 is screwed into the base member 30, the rim 71 will be firmly secured or anchored between the members 20 and 30.

Figure 5:
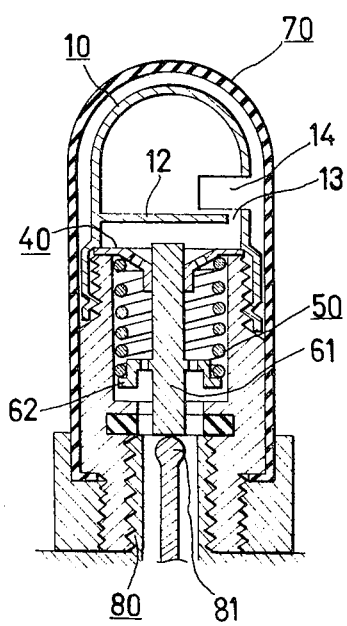
FIG. 5 is an elevational view in section, showing the device of the present invention in its normal position.
Figure 3:
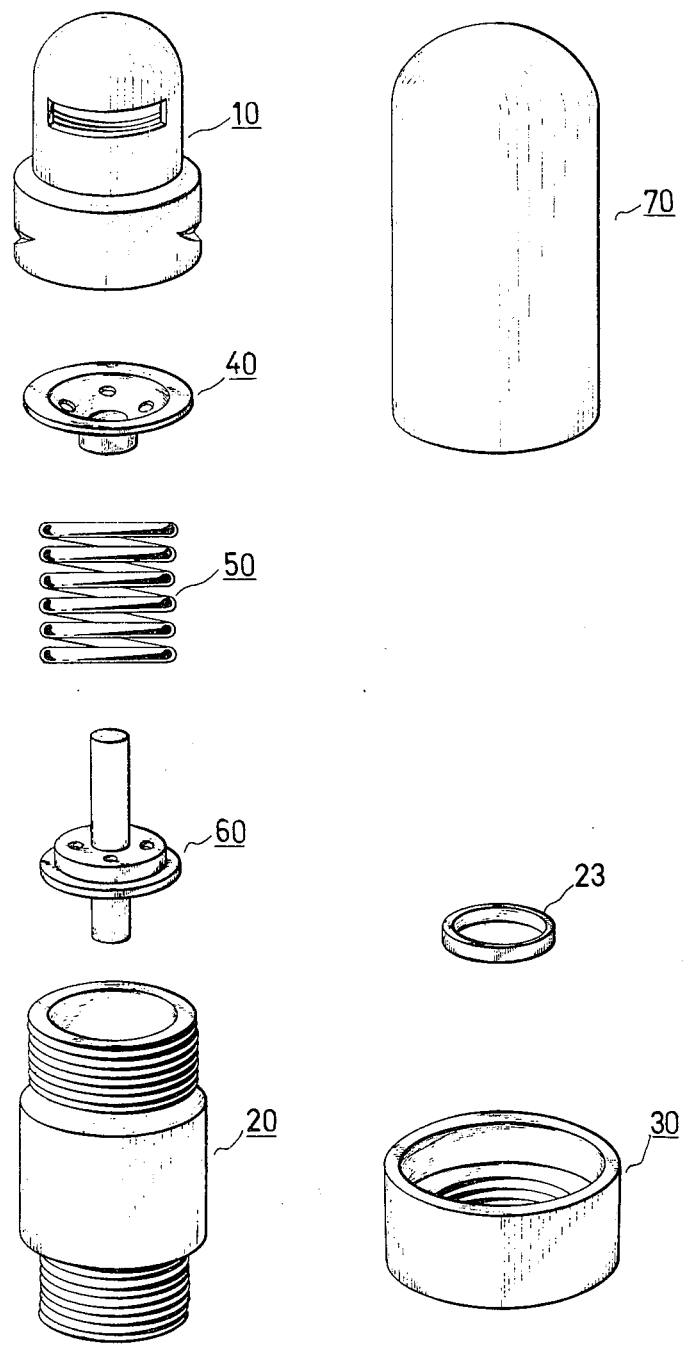
FIG. 3 is an exploded perspective view of the device of FIG. 2.
Figure 4:
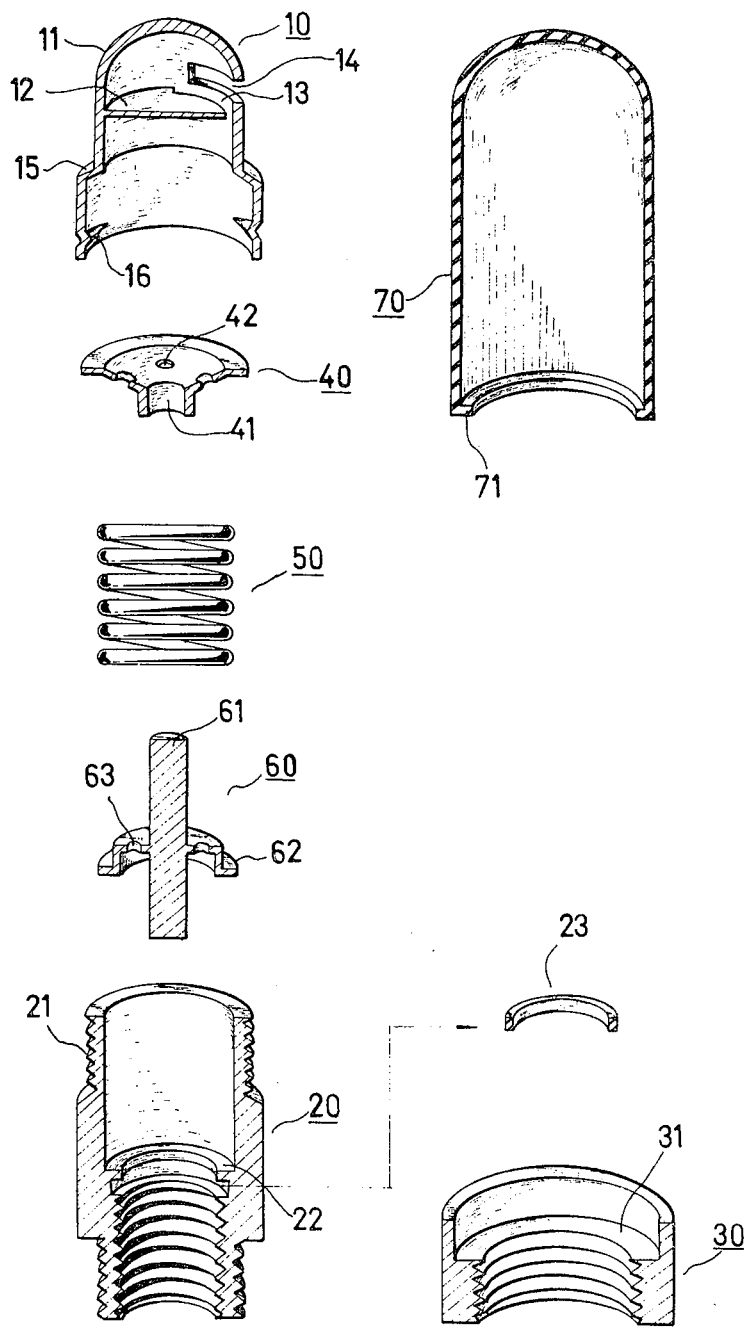
FIG. 4 is a view, in section, of the exploded parts shown in FIG. 3.

The use of the device of this invention will be best understood from the following description, with refernce to FIG. 5.

In this figure, the device is shown in its normally inactive position; that is, the device has already been installed onto the air valve means 80 of a tire having a normal air pressure. As shown in FIG. 5, the tip 81 of the air valve is acting on the lower end of rod 61 and urging piston means 60 upwardly against the spring 50 so as to make the said spring assume a compressed position. In this condition, the air valve 80 is in the closed position, but when the air pressure of the tire drops to a predetermined value through certain causes, such as for example, piercing by nails or the like, the tip of the air valve will be pushed downwardly by the restoration force of the spring 50, and thereby open the air valve. Upon the opening of said air valve, the air contained in the tire will rush out and pass therefrom toward the whistle member through perforations 63 formed on the piston means 60, cylinder member 20, perforation 42 formed on the plate 40, and finally act on the rubber sack 70 from the outlet port 14, whereby the rubber sack 70 will be swelled up like a balloon. When the pressure inside of the swelled rubber sack reaches its breaking point, the sack will burst and emit an explosive sound.

After the bursting of the sack, the outgoing air from the slit 13 and outlet port 14 of the whistle member 10 will produce a whistle and this whistle and the previously produced explosion will give a warning to the vehicle driver that one of his vehicle tires has an air leakage and that some remedy must be taken.

Accordingly, by using the device of the present invention the driver is made to realize the condition of his tires and take proper measures before developing a fatal damage to a defective tire or to the safety of the vehicle.

While a specific embodiment of the invention has been described herein, it is to be understood that modifications, substitions and equivalents may be used without departing from the spirit and scope of the inventive concept.

What I claim is:

1. An air leakage warning device for a pneumatic tire comprising: a substantially cylindrical whistle-producing member having an enlarged shoulder on the lower portion thereof; a cylinder member containing piston means, a coil spring surrounding the same and responsive to a predetermined pressure within the tire, a perforated disk plate covering the upper end thereof, a perforated shoulder carried by said piston and retaining said coil spring between the same and said disk plate, the upper end of the cylinder member being inter-connected with the shoulder portion of the whistle-producing member and said perforated disk plate, and the lower end thereof having internal threads adapted to be screwed onto a conventional air filling valve stem of the tire; a rubber sack enveloping the whistle-producing member and the cylinder member and forming a receiver for escaping air from the tire and adapted to be ruptured by air pressure so as to emit an audible signal, said rubber sack having an inwardly directed annular rim integrally formed on the circumference of the sack opening; a base member including a recess and an internal thread adapted to be screwed onto the lower exterior end of the cylinder member with said rim and the lower end of said rubber sack sandwiched therebetween, thereby tightly securing the rubber sack to the cylinder member; the whistle-producing member being provided with a radially extending plate on the inside of said whistle member and an air outlet port formed on the wall of said whistle member.

2. A device as claimed in claim 1, wherein the radially extending plate is provided with a slit which is adjacent to the air outlet port.

* * * * *